(12) United States Patent
Stern et al.

(10) Patent No.: US 6,397,218 B1
(45) Date of Patent: *May 28, 2002

(54) NETWORK INTERACTIVE SEARCH ENGINE SERVER AND METHOD

(75) Inventors: Edith H. Stern, Boca Raton; James M. Dunn, Ocean Ridge, both of FL (US); Barry E. Willner, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/366,906

(22) Filed: Aug. 4, 1999

(51) Int. Cl.[7] .............................................. G06F 17/30
(52) U.S. Cl. ...................................................... 707/10
(58) Field of Search .......................... 707/1–3, 103–104, 707/501, 5, 10, 9, 202, 203, 503, 100; 709/200–201, 203, 219; 705/7, 57, 5, 54, 80, 52; 717/8, 1; 345/339, 349

(56) References Cited

U.S. PATENT DOCUMENTS 6,078,914 A * 6/2000 Redfern ......................... 707/3
6,112,202 A * 8/2000 Kleinberg ...................... 707/5
6,119,124 A * 9/2000 Broder et al. ................ 707/103
6,138,113 A * 10/2000 Dean et al. ..................... 707/2
6,144,962 A * 11/2000 Weinberg et al. ............. 707/10
6,278,992 B1 * 8/2001 Curtis et al. .................... 707/3

* cited by examiner

*Primary Examiner*—John Breene
*Assistant Examiner*—Mohammad Ali
(74) *Attorney, Agent, or Firm*—Fleit, Kain, Gibbons, Gutman & Bongini P.L.; Jon A. Gibbons

(57) ABSTRACT

In a search engine server, a method for searching for data in a data network comprising hyperlinked pages comprising the steps of (1) receiving an initial set of network addresses for pages in the data network; (2) receiving a non-negative integer, N, specifying a chain length; (3) receiving a set of at least one search argument comprising search criteria; and (4) performing a search wherein all pages linked to said initial set of addresses by a chain of distance less than or equal to N are examined for compliance with the search criteria, and all pages meeting such criteria are returned as successful objects of the search. According to optional embodiments, the foregoing method can be implemented as a computer readable medium with instructions for performing the above steps, as an application program, or a browser resident at an end user's computer system. It is also possible to implement as a special purpose information handling system.

27 Claims, 8 Drawing Sheets

NETWORK INTERACTIVE SEARCH ENGINE SERVER AND METHOD

CROSS-REFERENCE TO RELATED APPLICATIONS

This application relates to an invention similar to that in a patent application having application Ser. No. 09/368,110, with the same inventors as identified above commonly assigned herewith to International Business Machines.

BACKGROUND OF THE INVENTION

1. Field of the Invention

The invention disclosed broadly relates to the field of computer networks, and more particularly relates to the field of search methods for the World-Wide Web (WWW or simply, the Web).

2. Description of the Related Art

The Internet is a global network of computers and computer networks that all linked communicate by virtue of the Internet Protocol (IP). The IP is a packet-switched communications protocol. In such protocols the information to be transmitted is broken up into a series of packets (i.e., sets of data) that are encapsulated in a sort of electronic envelope (the packet) including a portion called a header that includes fields for identifying the source of the transmission, the destination, and other information about the data to be delivered to the destination (called the payload). A popular application for the Internet is to access the Web which uses a protocol called HTTP (HyperText Transfer Protocol) by client units for connecting to servers in the Web. A client unit (e.g., a microcomputer unit with a communication subsystem connected to the Internet) invokes the HTTP by simply typing a "http://" prefix with the desired Web address. Once the connection is made to the desired Web site, the user (or client) can access any document stored on that site that is available to that user. The interface used by the client is an application program called a Web browser (the Netscape and Explorer browsers are popular examples). The browser establishes hypertext links to the subject server, enabling the user to view graphical and textual representations of information provided by the server.

The Web relies on an interpretative scripting language called HTML (HyperText Mark Up Language) which with Web-compliant browsers are capable of rendering text, graphics, images, audio, real-time video, etc. HTML is independent of client operating systems. So HTML renders the same content across a wide variety of software and hardware operating platforms. Software platforms include Windows 3.1, Windows NT, Apple's Copeland and Macintosh, and IBM's AIX and OS/2, HP Unix, etc. Popular compliant Web-Browsers include Microsoft's Internet Explorer, Netscape Navigator, Lynx and Mosaic. The browser interprets links to files, images, sound clips, etc. through the use of hypertext links. Upon user invocation of a hypertext link to a Web page, the browser initiates a network request to receive the desired Web page.

Users of the Internet are faced with an ever-increasing number of sites, each containing varied information. This results in difficulty finding the desired information. Among commonly used tools for locating information are the so-called search engines or portals to the Internet. These sites provide various indexes to other sites. Search engines use crawlers or spiders, programs having their own sets of rules, to index pages on the Web. Some of these follow every link on every page they find. Others ignore some kinds of links.

A common problem with the general Internet search is that often too many result pages are returned and many of these have low relevance to the search request issued by the end-user. Typically, the search engines used in corporate sites are not as powerful as the Internet search engines and typically provide less information than is desirable.

Finding information on the Internet, or on corporate intranets, can be a daunting task. Even targeted searches frequently result in hundreds or thousands of hits. Many producers of Web pages intentionally use techniques to cause their pages to be displayed as a result of searches which are not really pertinent. This results in too much information, much of it not useful. In addition, many Web domains have other links buried within their pages, and restricting a search to a specific Web domain results in ignoring information contained in these links. This results in too little information. Thus, there is a need for a search process producing more directly useable results.

Corporate sites frequently employ a search engine to allow users to search their corporate pages. These search engines are often less effective than desirable or lack advanced features of more generic search engines. At times, end users desire information which is in related sites, perhaps business partners, etc., which is not contained within the corporate pages and which will not be displayed as a result of the corporate page search. Some search engines, such as Hotbot, allow a user to specify a domain, but do not then search the related sites.

Accordingly, there is a need for a system for searching the Internet that limits the search results and which overcomes the above problems and produces more directly useful search results.

SUMMARY OF THE INVENTION

Briefly, according to the invention, a method for searching for data in a data network comprising hyperlinked pages comprising the steps of (1) receiving an initial set of network addresses for pages in the data network; (2) receiving a non-negative integer, N, specifying a chain length; (3) receiving a set of at least one search argument comprising search criteria; and (4) performing a search wherein all pages linked to said initial set of addresses by a chain of distance less than or equal to N are examined for compliance with the search criteria, and all pages meeting such criteria are returned as successful objects of the search.

According to optional embodiments the foregoing method can be implemented as a computer readable medium with instructions for performing the above steps, as an application program, or a browser resident at an end user's computer system. It is also possible to implement as a special purpose information handling system.

DETAILED DESCRIPTION OF AN EMBODIMENT

Figure 1:
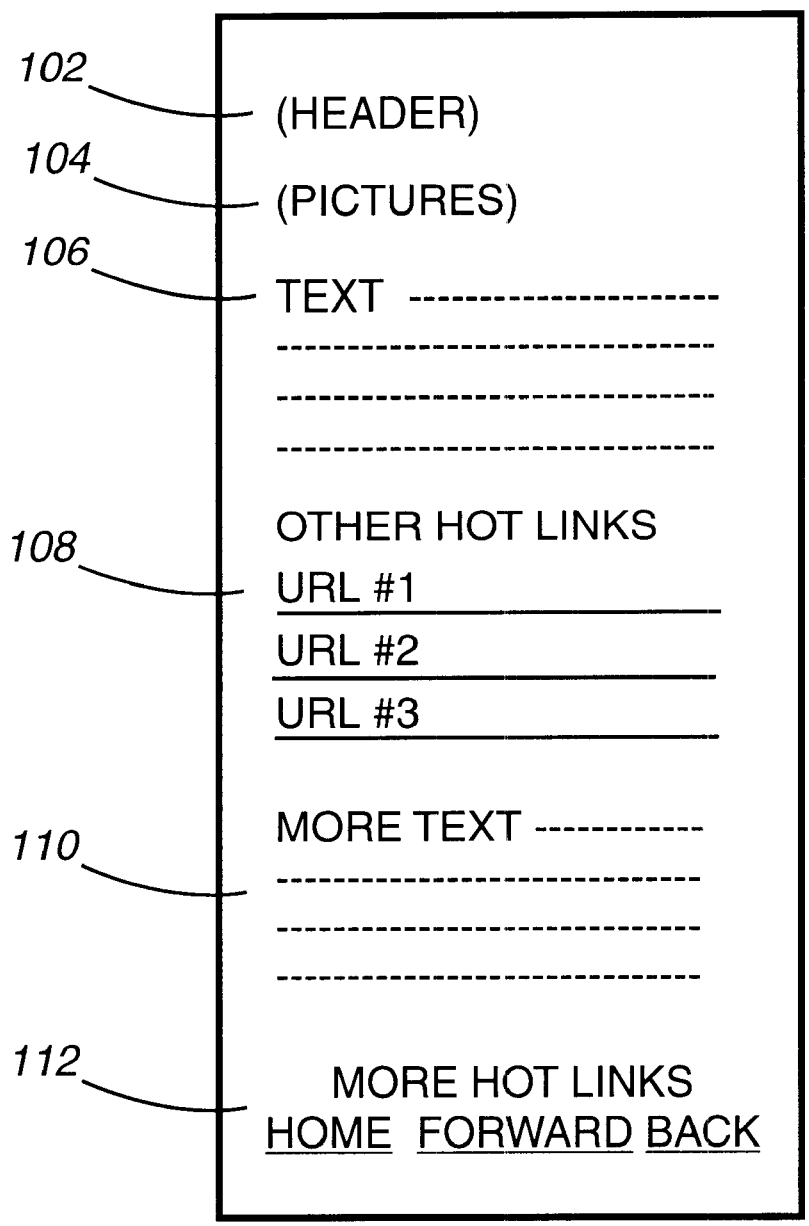
FIG. 1 is an illustration of a typical Internet Web page.

In FIG. 1 we show a typical Internet search result page 100 that may have been produced from a search inquiry using any of the popular search engines such as AltaVista, Lycos, Excite or any others. It may contain headers and footer information 102, graphic pictures and animation 104, and typically contains text information 106 and 110. It also typically contains other "hot links" (URL references 108 with the appropriate supporting logic to allow a user to "click" on the address or phrase and have the browser initiate a call to that location). Depending on how precise the original search arguments were, and how many references exist, the number of pages returned may be small or very large, as noted earlier.

Figure 2:
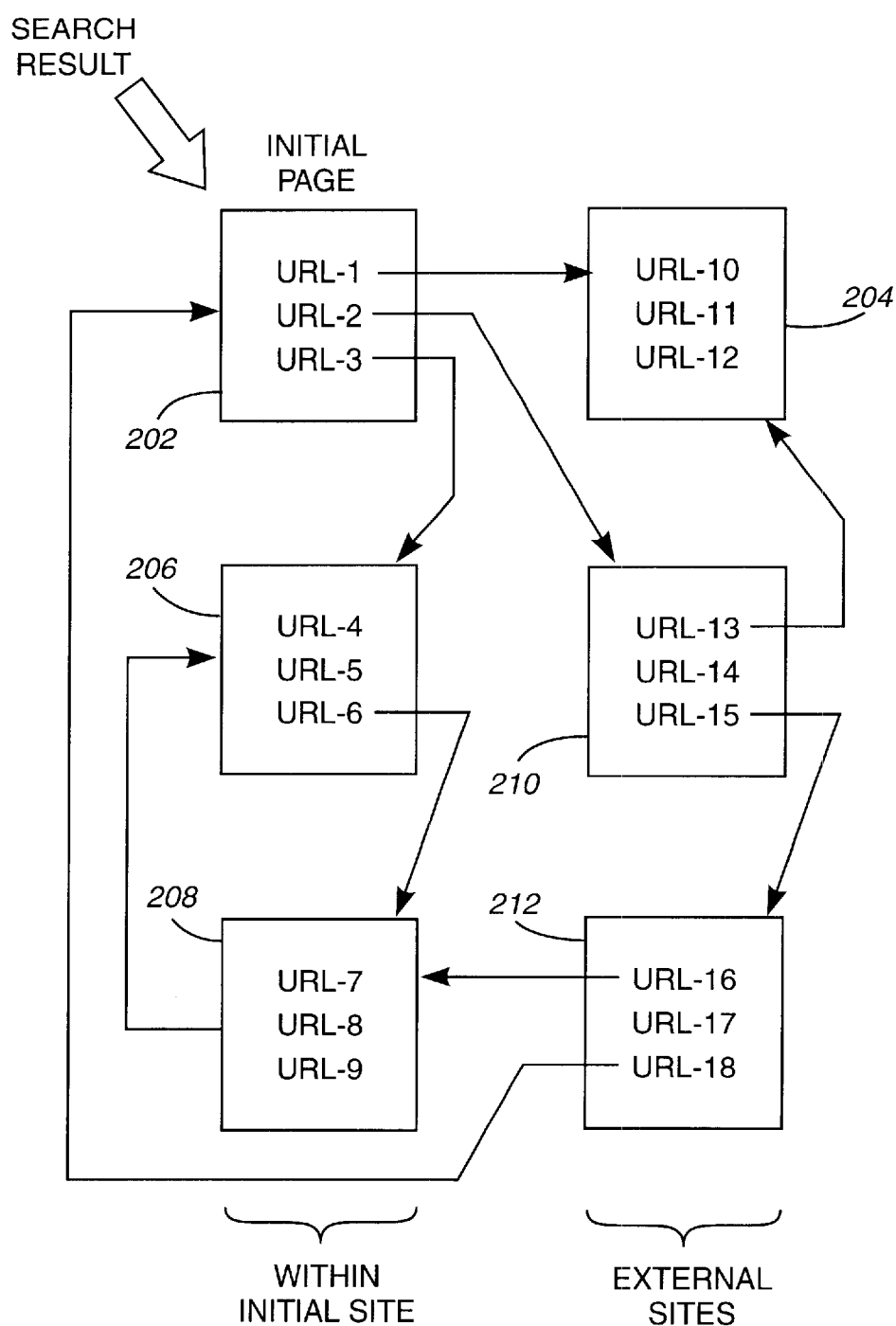
FIG. 2 is an illustration of typical Internet Web page linkage showing a results page produced by a search engine and links to other sites.

A pictorial representation of the results of a typical search are shown in FIG. 2. The initial search results are shown in the Initial Page 202. Page 202 shows three network addresses (URLs 1–3). Each URL points at (or links to) a different page. The page at URL-1 points to page 204; the page at URL-2 points at page 210; and the page at URL-3 points at page 206. Each of these pages, comprise URLs that identify pages that link to other pages.

Pages 202, 206 and 208 are all within the same site; whereas pages 204, 210 and 212 are in other sites. Pages point to other pages, with URLs that again point to other pages, and often loop back to pages already referenced.

FIG. 2 can be thought of as a tree, with a "root" (the first page found, page 202) and "branches" (the next layer of pages that page 202 references, pages 206, 204, and 210), with more branches that each of these pages reference, etc.

Figure 3:
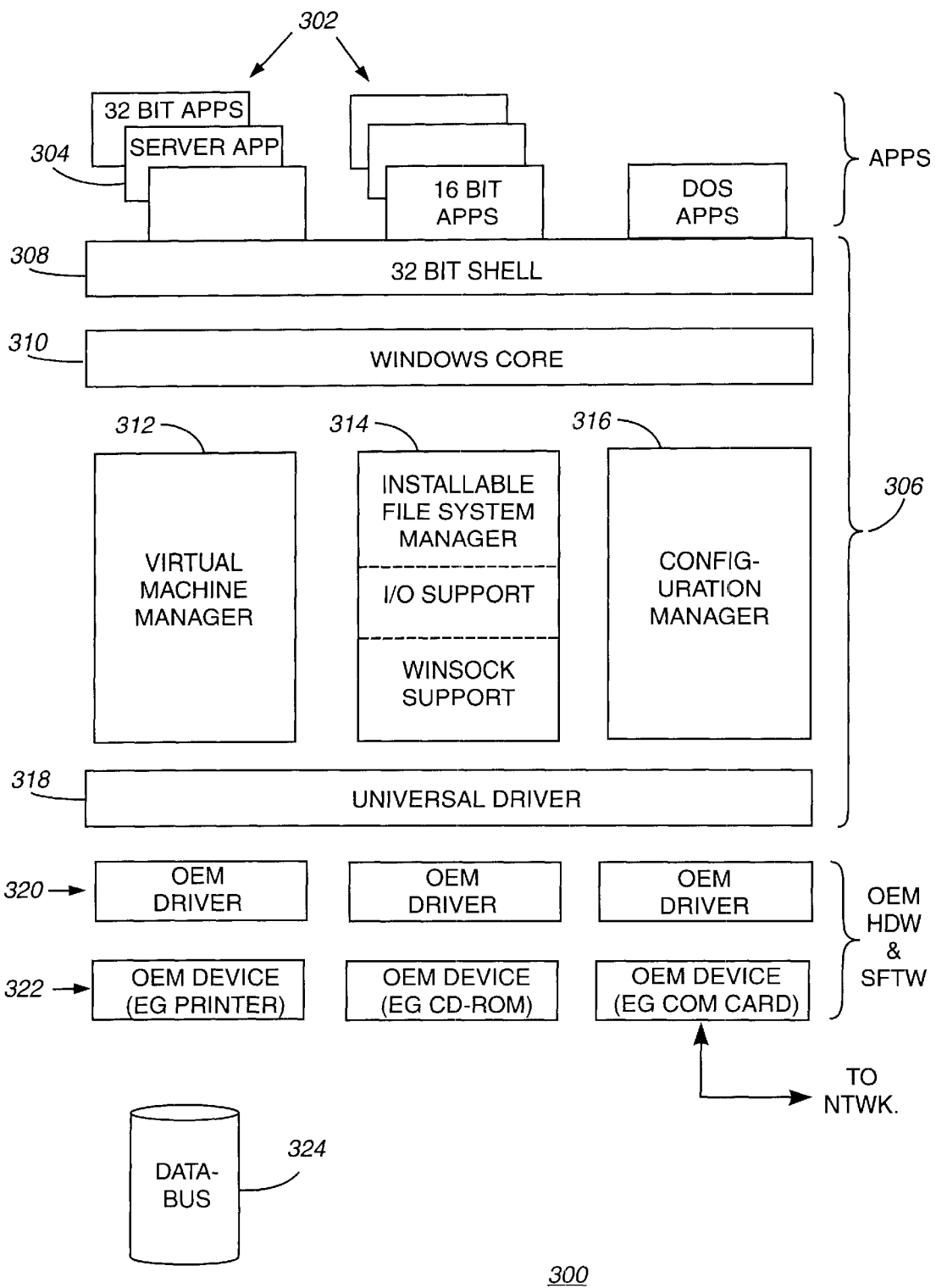
FIG. 3 shows a simplified configuration of an information handling system suitable for performing a search method according to the invention.

Referring to FIG. 3, there is shown an illustration of the software and hardware configuration for a search engine 300 according to an aspect of the invention. The search engine 300 comprises a plurality of software applications 302 including a server application 304 operating in accordance with the invention. The configuration 300 also includes a Windows NT Operating System 306 comprising a 32-bit shell 308 and a windows core 310 for interacting with the applications programs. The Windows NT Operating System 306 comprises a virtual machine manager 312, an installable file manager system/I/O support/Winsock Support module 314, and a configuration manager. The Operating System 306 also includes a universal driver 318 for interacting with various device drivers 320, each provided by an OEM (original equipment manufacturer) each for driving a plurality of OEM devices 322 (e.g., a printer, CD ROM drive, and communications card). Other conventional hardware and software components for information handling systems is included but not shown, for purposes of simplicity. The server 300 also includes a database 324 containing information on all or substantially all of the contents of the Internet. This data collection is possibly made by a Web crawler or other program that automatically retrieves data from the Internet or the web. The database 324 enables the search engine 300 to perform all of the required searching without having to search other sites in the Internet. The processing power of the search engine 300 is great enough to produce fast results for the user, thus enhancing the interactive aspect of tree searches according to the invention.

In a method according to one aspect of the invention, the server application 304 allows for standard search classifications and operators. This includes any terms, Boolean operators such as AND, OR, NOT, NOR, etc; and also allows a "starting location" parameter. The application 304 includes program instructions for performing any of various methods according to the invention.

For simplicity, the application is shown as a search engine server application running on a Windows NT system. However, the application could run as a client and on any operating system such as Windows, Netware, UNIX, or IBM OS/2, since all modern operating systems have the ability for applications to pass messages among the applications they support.

Figure 4:
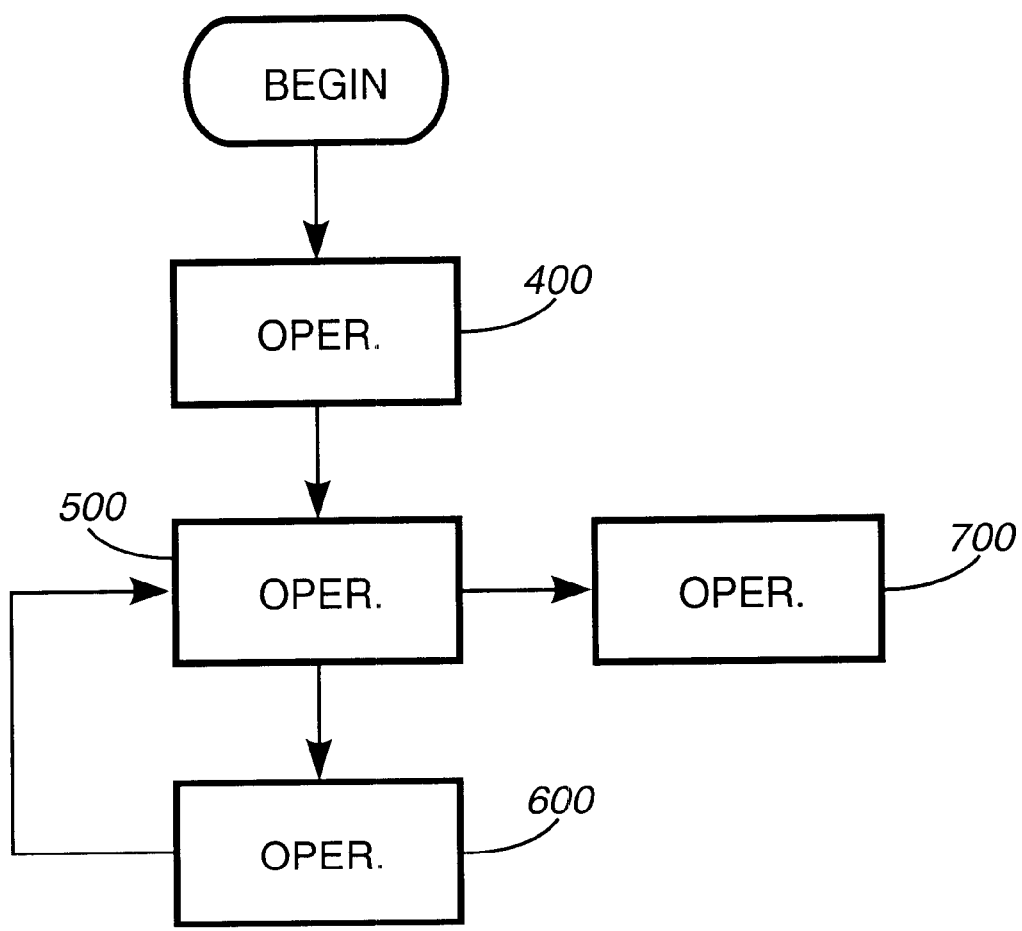
FIG. 4 is a simplified flow chart for four basic processes according to the invention.

In FIG. 4 we show a simplified flowchart illustrating a method for performing a search according to the invention. The method comprises four principal operations 400, 500, 600, and 700. Operation 400 comprises various steps (see FIG. 5) for generating a search argument to be sent to a search engine. Operation 500 relates to determining the parameters of a tree search. Operation 600 relates to building the search tree. Operation 700 relates to presenting the user with a choice of a verbose (full tree) list of search results or a list of root search results only. The chart shows that the process may proceed from operation 500 directly to operation 700 (if no tree search is selected) or may proceed to operating 600 and then operation 500 and on to operation 700.

Figure 5:
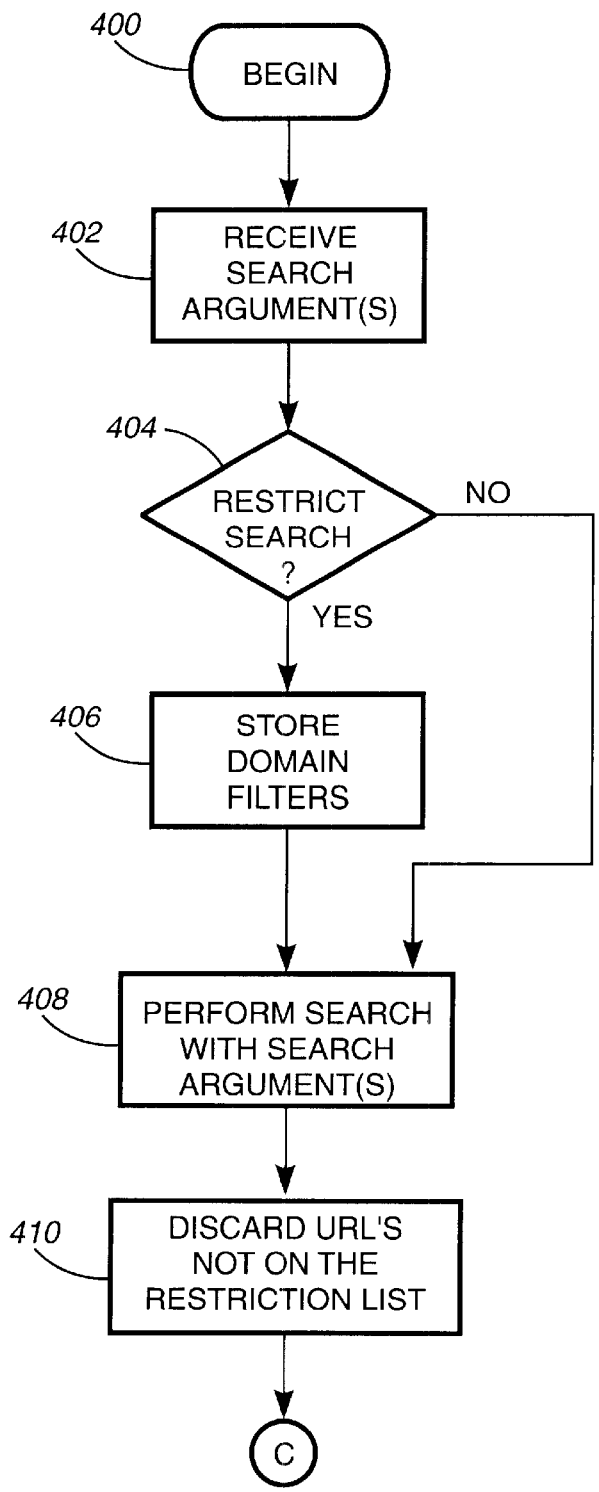
FIG. 5 is a flow chart illustrating the first process shown in FIG. 4.

Referring to FIG. 5, there is shown detail of the process of block 400. In step 402, the search engine receives search arguments and any location restriction. A decision 404 is then made to determine whether the search should be restricted to specific domains or locations. If it is not restricted, in step 408, a search is performed. The "required location" parameter is an option for the user to limit (or restrict) the search to a given site or set of sites. If the search is restricted, then in step 406, the domain filters are stored for later use, and the process continues at step 408. In step 410 the URLs not on the restriction list are discarded.

Figure 6:
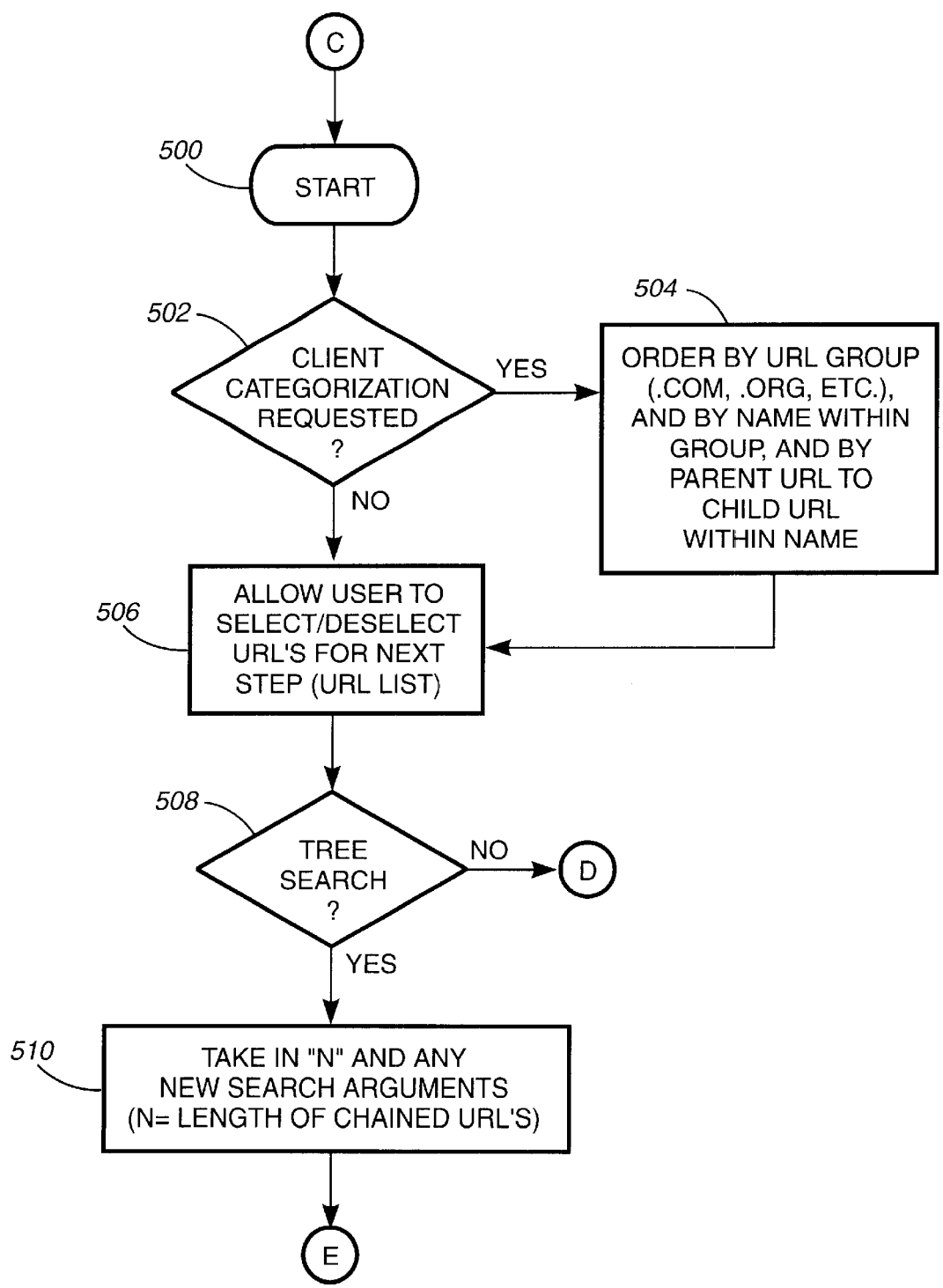
FIG. 6 is a flow chart illustrating the second process of FIG. 4.
Figure 7:
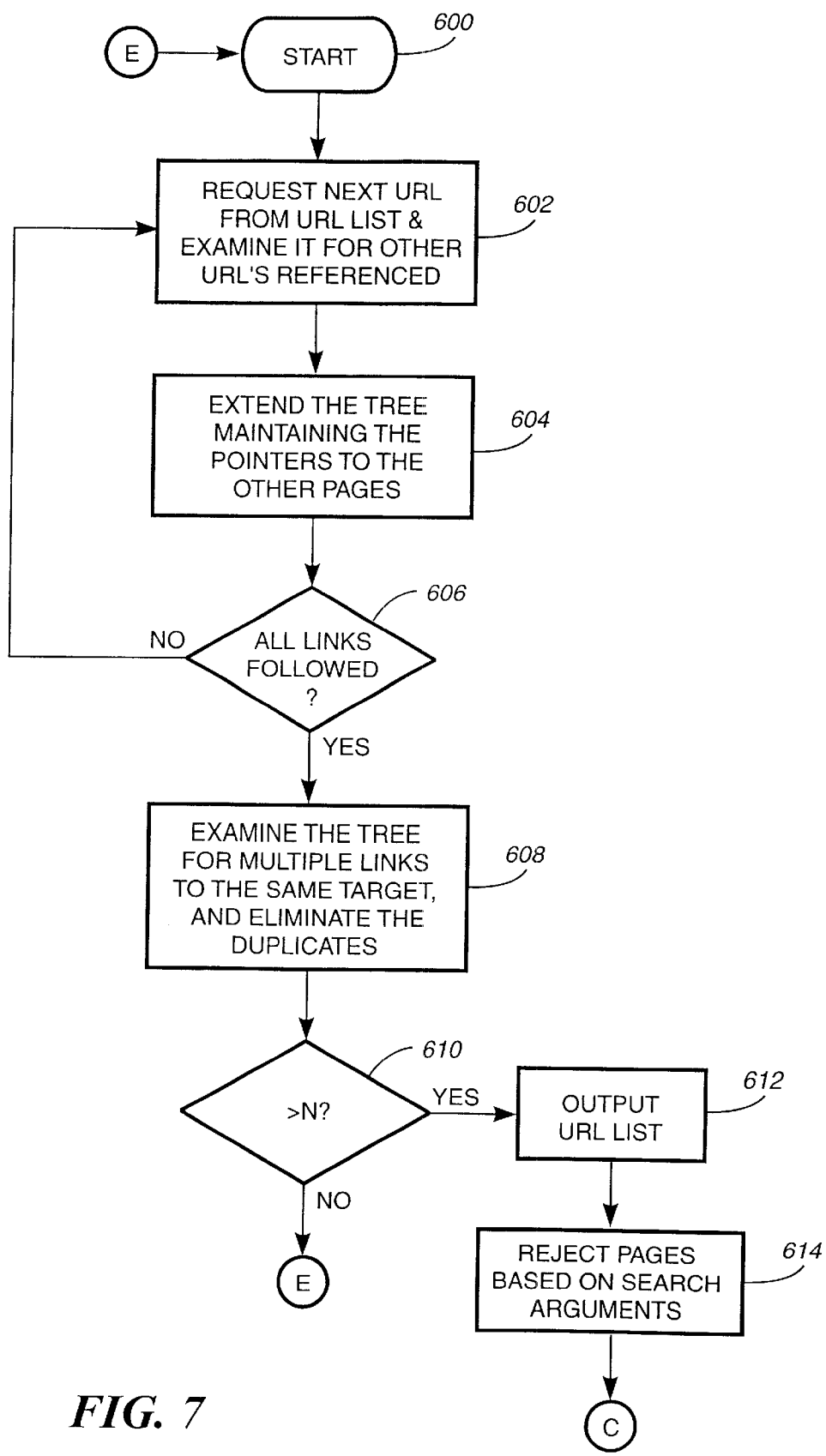
FIG. 7 is a flow chart illustrating the third process of FIG. 4.

Referring to FIG. 6, the process 500 begins at decision 502 wherein a determination is made to establish whether client categorization has been requested. If it has, then step 504 orders the search results by URL group (.com, .org, etc), by name within the group, and by most senior URL to least senior URL name. We define most senior as the page with the least number of additional slashes (/) after the ".com" or other qualifier.

In step 506 the user receives the grouped search results and is allowed to select/deselect URLs for the next step. This step occurs in response to a negative determination in decision 502 or directly follows step 504. Thus, the application 304 (optionally) displays the clustered list and allows the user to select/deselect clusters ordered to continue to operate upon. For instance, the user could command the application to discard the ".gov" clusters and the clusters of the form ".org" since the user may not be looking for information from the government or organizations at this time. In decision 508, a determination is made as to whether a tree search has been selected. If not, the process continues at decision 702 in FIG. 8. If a tree search has been selected, the process is continued at step 510. In step 510, the application 304 prompts the user for "N", the length of the chain of links to be used in the tree search, and the search arguments to be used in the tree search.

Operation 600 provides the tree search. The first time through, we use the list of URLs produced in operation 500 as our tree list. In steps 602–606 we use the tree list of URLs, examine the page associated with each URL on the list, and add any new URLs contained on those pages to the tree. Step 606 is the decision step where we determine whether we have exhausted the list of URLs we began with in step 602, or whether there are more uninspected pages associated with the list.

Figure 8:
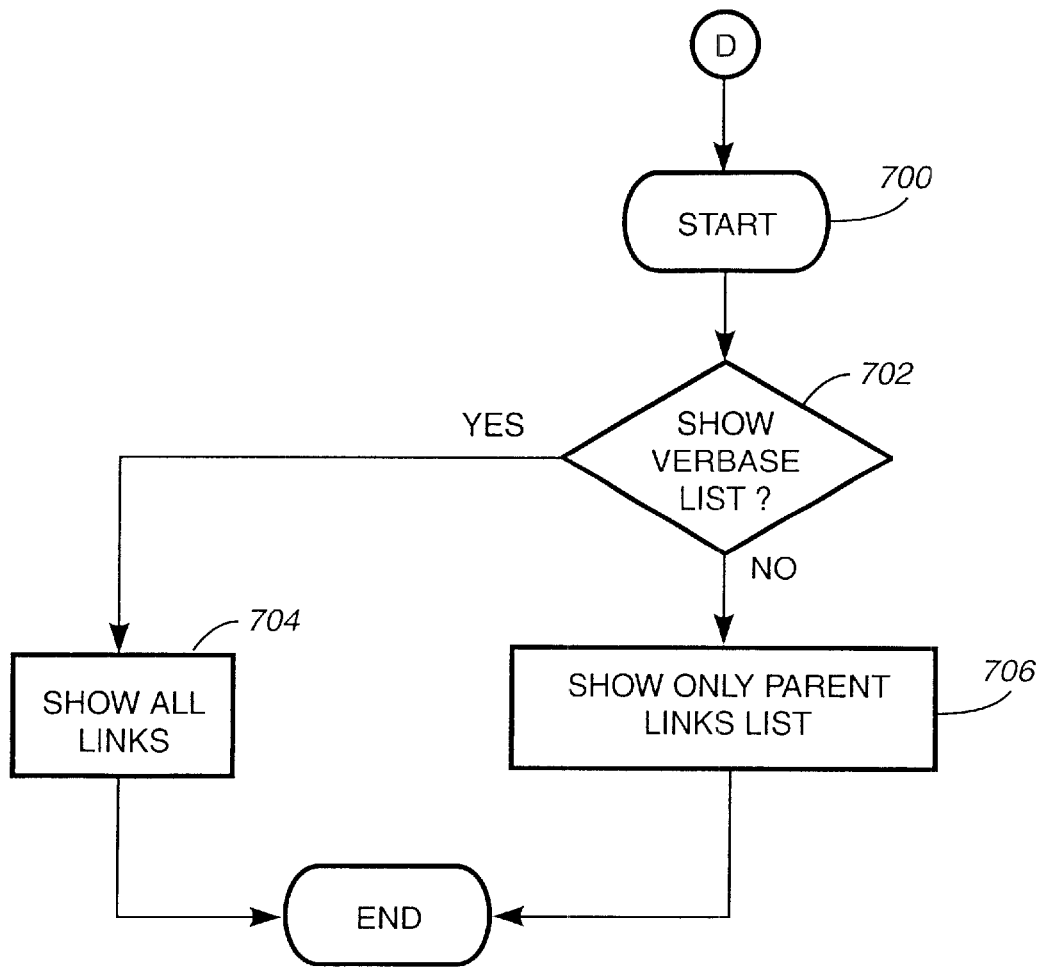
FIG. 8 is a flow chart illustrating the fourth process relating to presenting the URL list to the user.

In step 608 the search tree is examined for duplicate links to the same page and these duplicates are eliminated from the list. The process continues at decision 610. In step 610, we determine if we have completed N iterations, that is followed the URLs to a chain N deep. If we have not, we continue the process in step 602, and follow each of the URLs on the tree for one more step. This increases the chain length by one. If in step 610, we conclude that we have completed the chain of length N, a URL list is produced in step 612. In step 614, we examine the pages referenced on this list to see if they meet the search criteria. We reject those pages not meeting the search criteria and output the list of URLs that do meet the search criteria. This list is output to operation 700 (FIG. 4) with the details shown in FIG. 8. Referring to FIG. 8, operation 700 begins with a decision 702 wherein it is determined whether the user has selected a verbose list. If yes, then in step 704 all links resulting from the search tree are shown. If not, then in step 706 only the most senior links are shown in the list of references (this is called a "terse" list).

An alternative embodiment is to allow this process to run on an application within the client. The client application would accomplish process 400, FIG. 4, by calling on a web browser to use conventional search engines to perform the search in step 408.

This methodology allows the user a great deal of flexibility in how a search is conducted. For example, if a search is first undertaken without using this application, and a reasonably small number of hits is returned, the search data can be examined the same way it is today, essentially by serial examination of each page URL returned. If a large number of hits is returned, the original search arguments could be given to the new application, either by reentering them or by using the clipboard function (or its equivalent), and then running the application to reduce the number of hits while increasing the relevancy of those finally returned.

This invention supports extending the search to reach all the URLs reachable from a given URL, or to restrict the search to a specific targeted location.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

We claim:

1. In a search engine server coupled to one or more client units, a method for searching for data in a data network comprising hyperlinked pages, the method comprising:

receiving from an end user operating a client unit, a non-negative integer, N, specifying a chain length;

receiving from the end user operating the client unit, zero or more sets of network addresses for pages in a data network;

receiving from the end user operating the client unit a set of at least one search argument comprising search criteria;

forming one or more parameters using the set of at least one search argument to perform a search specific to at least one selected search engine;

returning any result pages to form a base list of addresses from the selected search engine;

discarding from the base list of addresses any address which is outside the zero or more sets of network addresses;

forming a tree list of addresses, which includes the base list of addresses, by iteratively examining each page referenced in the tree list of addresses and adding any new address referenced in each page provided that any new page added is only a chain length distance less than or equal to N from an address in the base list of addresses; and removing from the tree list of addresses any pages which do not match the set of at least one search argument.

2. The method of claim 1 wherein the pages representing successful objects of the search are further edited by the end user.

3. The method of claim 2, wherein the pages representing successful objects of the search are sorted (client categorization) to facilitate the user editing of network addresses.

4. The method of claim 2 wherein the pages representing successful objects of the search are presented to the end user in the hierarchical structure of the links to facilitate editing.

5. The method of claim 1 further comprising:

removing from the tree list of address any pages which have previously been added to the tree list so as to delete any duplicate entries.

6. The method of claim 1 further comprising:

providing the user with a choice of a verbose or terse list of tree search results.

7. The method of claim 6 further comprising:

displaying all links produced by the tree search when the display of the verbose list has been selected.

8. The method of claim 6 further comprising:

displaying only most senior links when the display of a terse list has been selected.

9. The method of claim 1 wherein the network comprises the internet and the addresses comprise Uniform Resource Locator references (URLs).

10. A computer readable medium comprising program instructions for a search engine server coupled to one or more client units, wherein the instructions are for searching for data in a data network comprising hyperlinked pages, the instructions comprising:

receiving from an end user operating a client unit, a non-negative integer, N, specifying a chain length;

receiving from the end user operating the client unit, zero or more sets of network addresses for pages in a data network;

receiving from the end user operating the client unit a set of at least one search argument comprising search criteria;

forming one or more parameters using the set of at least one search argument to perform a search specific to at least one selected search engine;

returning any result pages to form a basic list of addresses from the selected search engine;

discarding from the base list of addresses any address which is outside the zero or more sets of network addresses;

forming a tree list of addresses, which includes the base list of addresses, by iteratively examining each page referenced in the tree list of addresses and adding any new address referenced in each page provided that any new page added is only a chain length distance less than or equal to N from an address in the base list of addresses; and removing from the tree list of addresses any pages which do not match the set of at least one search argument.

11. The computer readable medium of claim 10 wherein the pages representing successful objects of the search are further edited by the end user.

12. The computer readable medium of claim 11 wherein the pages representing successful objects of the search are sorted (client categorization) to facilitate the user editing of network addresses.

13. The computer readable medium of claim 11 wherein the pages representing successful objects of the search are presented to the end user in the hierarchical structure of the links to facilitate editing.

14. The computer readable medium of claim 10 further comprising:

removing from the tree list of address any pages which have previously been added to the tree list so as to delete any duplicate entries.

15. The computer readable medium of claim 10 further comprising:

providing the user with a choice of a verbose or terse list of tree search results.

16. The computer readable medium of claim 15 further comprising instructions for displaying all links when the display of the verbose list has been selected.

17. The computer readable medium of claim 15 further comprising instructions for displaying only most senior links when the display of a terse list has been selected.

18. The computer readable medium of claim 10 wherein the network comprises the Internet and the addresses comprise Uniform Resource Locator references (URLs).

19. A search engine for a data network coupled to one or more client units, the search engine for searching hyper-linked pages, the server comprising:

means for receiving from an end user operating a client unit, a non-negative integer, N, specifying a chain length;

means for receiving from the end user operating the client unit, zero or more sets of network addresses for pages in a data network;

means for receiving from the end user operating the client unit a set of at least one search argument comprising search criteria;

means for forming one or more parameters using the set of at least one search argument to perform a search specific to at least one selected search engine;

means for returning any result pages to form a base list of addresses from the selected search engine;

means for discarding from the base list of addresses any address which is outside the zero or more sets of network addresses;

means for forming a tree list of addresses, which includes the base list of addresses, by iteratively examining each page referenced in the tree list of addresses and adding any new address referenced in each page provided that any new page added is only a chain length distance less than or equal to N from an address in the base list of addresses; and removing from the tree list of addresses any pages which do not match the set of at least one search argument.

20. The search engine of claim 19 wherein the pages representing successful objects of the search are further edited by the end user.

21. The search engine of claim 20 wherein the pages representing successful objects of the search are sorted (client categorization) to facilitate the user editing of network addresses.

22. The search engine of claim 20 wherein the pages representing successful objects of the search are presented to the end user in the hierarchical structure of the links to facilitate editing.

23. The system of claim 19 further comprising:

removing from the tree list of address any pages which have previously been added to the tree list so as to delete any duplicate entries.

24. The search engine of claim 19 further comprising:

means for providing the user with a choice of a verbose or terse list of tree search results.

25. The search engine of claim 24 further comprising:

means for displaying all links produced by the tree search when the display of the verbose list has been selected.

26. The search engine of claim 24 further comprising:

means for displaying only most senior links when the display of a terse list has been selected.

27. The system of claim 19 wherein the network comprises the Internet and the addresses comprise Uniform Resource Locator references (URLs).

* * * * *